Aug. 14, 1945.　　　　E. A. STALKER　　　　2,382,343
AIRCRAFT POWER PLANTS
Original Filed Jan. 9, 1942

Inventor
Edward A. Stalker

By
Marechal and Biebel
Attorneys

Patented Aug. 14, 1945

2,382,343

UNITED STATES PATENT OFFICE 2,382,343

AIRCRAFT POWER PLANT

Edward A. Stalker, Bay City, Mich., assignor to The Dow Chemical Company, Midland, Mich., a corporation of Michigan Original application January 9, 1942, Serial No. 426,100. Divided and this application August 10, 1944, Serial No. 548,864

10 Claims. (Cl. 60—97)

My invention relates to improvements in aircraft and particularly to the power plant.

An object of the invention is to provide an aircraft with a plurality of prime movers of which one or more may be disconnected from the propulsive device and maintained in a condition for the quick supply of power to the device.

Other objects and advantages will be pointed out hereinafter or will become apparent as the description proceeds.

In the accompanying drawing in which like numerals are used to designate similar parts throughout, there is illustrated a suitable mechanical embodiment of what is now considered to be the preferred form of the invention. The drawing however is for the purpose of illustration only and is not to be taken as limiting the invention, the scope of which is to be measured entirely by the appended claims.

In military aircraft a great amount of power is desirable while actually engaged in combat but with a properly designed aircraft only a fraction of this power is needed to reach the enemy objective quickly enough. Obviously a fighter can accompany bombers further from home if they can fly with a small fraction of their maximum power. Likewise bombers can travel greater distances if they are to use their full power only while in the vicinity of their target.

If the airplane has a large aspect ratio so that it can fly at a high value of the maximum L/D the power requirement is very low. In the ordinary airplane this is not practical because the airplane then flies too slowly. However if the wing is equipped with some means of increasing the maximum lifting capacity and the wing area reduced, the airplane will then fly at maximum L/D at a very high speed. It then becomes practical to fly the airplane on less than the maximum power of one engine in the case where the total number is two, or in other words at less than one-half power.

In the ideal case the maximum lift coefficient is sufficiently high to reduce the wing area so that the maximum flight speed coincides with the speed of maximum L/D.

It is desirable to keep the idle engine warm so that it may quickly provide full power as would be desired if the enemy were sighted.

Figure 3:
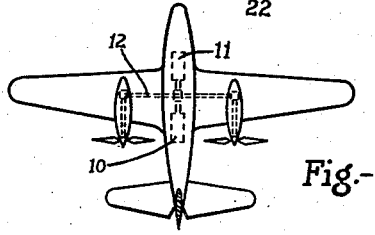
Fig. 3 is a top plan view of an aircraft incorporating the power plant.

Referring to the drawing which discloses a preferred embodiment of the invention, the engines are shown at 10 and 11, and they are arranged to drive shaft 12 through the automatic clutches 13 and 14, respectively, and the bevel gears 15, 16, and 17. Fan blades 18 and 19 are mounted on the respective drive shafts of the engines to serve as a blower for producing a flow of cooling air over the engines. The shaft 12 extends spanwise in the wing of the airplane as shown in Fig. 3.

The engines have exhaust collector rings 20 and 21 respectively. Normally with both engines operating under power the exhaust gases leave the collector rings through the tubes 22 and 23, respectively. The two collector rings are interconnected through the pipe 24. The engines are also preferably enclosed within a housing 25 which directs the flow of cooling air over the engines.

Figure 1:
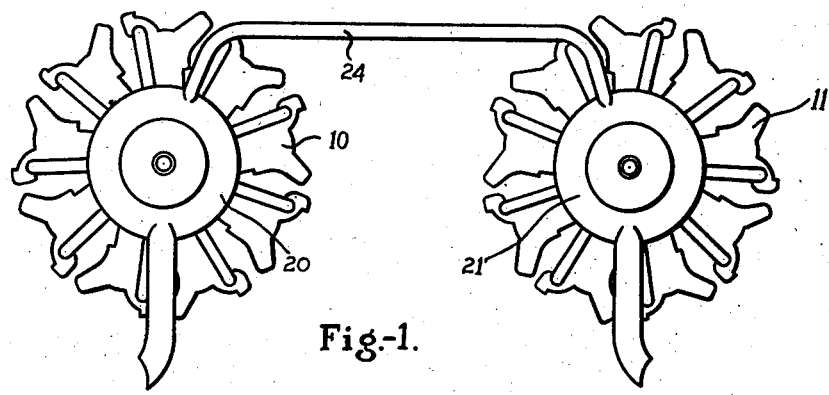
Fig. 1 is a schematic view of the invention as applied to radial or air cooled engines.
Figure 2:
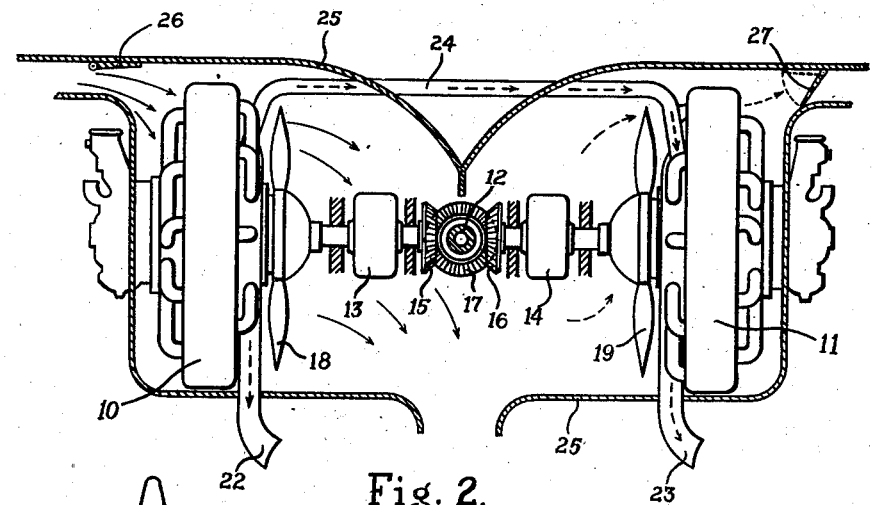
Fig. 2 is a schematic elevational view of the power plant in relation to the drive shaft running along the wing span.

If only one of the engines is operating, such as engine 10, the idle engine 11 may be disconnected from the power shaft 12 by the operation of its automatic clutch 14. However it will receive hot gas from the exhaust of engine 10 through the pipe 24 as indicated by the arrows in Fig. 2. This hot gas will reach all the cylinders exterior thereof and will actually invade some which have their exhaust valves open. The pipe 24 and ring 21 will also warm the air in the housing or casing 25 which normally conducts the cooling air past the working engine and then over the idle engine. The flow of cooling air is controlled by means of valves 26 and 27 which are suitably adjustable to control the respective flows therethrough as desired. Thus as shown in Fig. 2 valve 26 is open to provide for flow of cooling air over the working engine 10 while valve 27 is closed to exclude the cooling air from the idle engine 11. Valve 27 may also be moved to open position as indicated in dotted lines to provide for the flow of such air, heated by passage over the working engine, over the idle engine which is thus further heated. With engine 11 thus kept hot, it may be connected at any instant to the shaft 12 by the operation of clutch 14, and is in condition to provide for furnishing full power without delay.

I have now described suitable embodiments of my invention which are now preferred. It is to be understood however that the invention is not limited to the particular construction illustrated and described and that I intend to claim it broadly as indicated by the scope of the appended claims.

I claim:

1. In combination, a plurality of heat engines having exhaust gas chambers containing hot fluid when the respective engine is operating under power, a driven shaft, clutch means engaging said engines to said shaft and operable to disengage an engine, and duct means interconnecting the said chambers to direct hot fluid from the engaged engine operating under power to the disengaged engine.

2. In combination, a plurality of heat engines having chambers containing hot fluid when the respective engine is operating under power, an exhaust ring associated with each engine for receiving the hot fluid from said respective chambers, a driven shaft, clutch means engaging said engines to said shaft and operable to disengage an engine when not operating under power, and duct means interconnecting said exhaust rings to direct hot fluid from an engaged engine operating under power to a disengaged engine.

3. In combination, a plurality of heat engines having chambers containing hot fluid when the respective engine is operating under power, an exhaust ring associated with each engine for receiving the hot fluid from said respective chambers, a separate exhaust passage for each said exhaust ring, a driven shaft, clutch means for engaging said engines to said shaft and operable to disengage an engine when not operating under power, and duct means interconnecting said exhaust rings at corresponding points spaced from said separate exhaust passages to direct hot fluid from an engaged engine operating under power to a disengaged engine.

4. In combination, a plurality of heat engines having exhaust gas chambers containing hot fluid when the respective engine is operating under power, a driven shaft, clutch means engaging said engines to said shaft and operable to disengage an engine when not operating under power, duct means interconnecting said chambers to direct hot fluid from an engaged engine operating under power to a disengaged engine, means associated with each of said engines for directing a flow of cooling air thereover, and means for excluding said flow of cooling air from a disengaged engine.

5. In combination, a plurality of heat engines having chambers containing hot fluid when the respective engine is operating under power, an exhaust ring associated with each engine for receiving the hot fluid from said respective chambers, a separate exhaust passage for each said exhaust ring, a driven shaft, clutch means for engaging said engines to said shaft and operable to disengage an engine when not operating under power, duct means interconnecting said exhaust rings at corresponding points spaced from said separate exhaust passages to direct hot fluid from an engaged engine operating under power to a disengaged engine, means associated with each of said engines for directing a flow of cooling air thereover, and means for excluding said flow of cooling air from a disengaged engine.

6. In combination, a plurality of heat engines adapted to become heated when working and each having a drive shaft, means for selectively connecting said drive shafts to a load and providing for individual disconnection of the drive shaft of an idle engine, housing means for enclosing a working and an idle engine, and means including said housing means for directing a flow of cooling air over a working engine and then over an idle engine to transfer heat to the idle engine to keep the idle engine warm.

7. In combination, a plurality of heat engines adapted to become heated when working and each having a drive shaft, means for selectively connecting said drive shafts to a load and providing for individual disconnection of the drive shaft of an idle engine, housing means for enclosing a working and an idle engine and providing a path of flow for cooling air thereover, and valve means in said housing means for controlling the flow of cooling air through said housing to direct such flow over a working engine where it is heated and then over an idle engine to keep such idle engine warm.

8. In combination, a plurality of heat engines adapted to become heated when working and each having a drive shaft, means for selectively connecting said drive shafts to a load and providing for individual disconnection of the drive shaft of an idle engine, housing means for enclosing a working and an idle engine, and blower means for producing a flow of cooling air through said housing over said working engine and then over said idle engine to keep said idle engine warm.

9. In combination a plurality of heat engines having chambers containing hot fluid when the respective engine is operating under power, means for selectively coupling said engines to a load and providing for individual disconnection of an idle engine therefrom, duct means interconnecting said chambers to direct hot fluid from a working engine to an idle engine, housing means enclosing said working and said idle engines and providing a path of flow for cooling air over said engines, and means including said housing means for directing a flow of cooling air over said working engine and then over said idle engine to transfer heat to said idle engine to keep said idle engine warm.

10. In combination a plurality of heat engines having chambers containing hot fluid when the respective engine is operating under power, means for selectively coupling said engines to a load and providing for individual disconnection of an idle engine therefrom, duct means interconnecting said chambers to direct hot fluid from a working engine to an idle engine, housing means enclosing a working engine and an idle engine, said housing means also enclosing at least a portion of said duct means and providing a path of flow for cooling air over said engines, and means including said housing means for directing a flow of cooling air over said working engine and over said duct means and then over said idle engine to provide for transfer of heat to said idle engine to keep said idle engine warm.

EDWARD A. STALKER.